Aug. 2, 1955   R. PLANTE   2,714,331
EXTENSIBLE REAR VIEW MIRROR
Filed Feb. 23, 1954
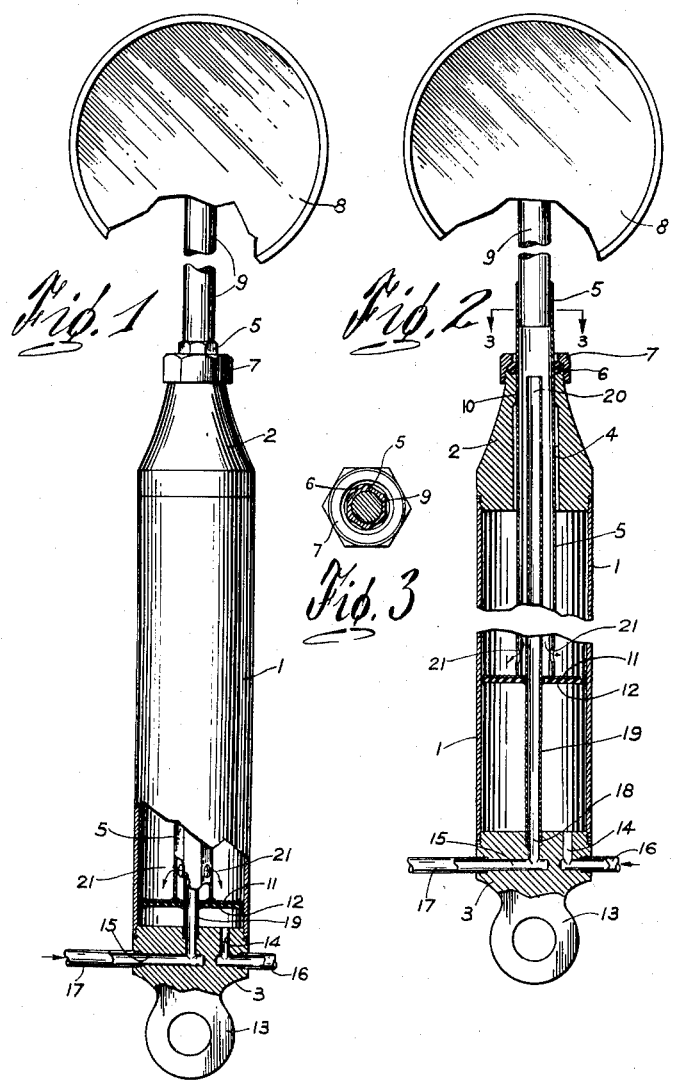
Inventor
Romeo Plante

United States Patent Office 2,714,331
Patented Aug. 2, 1955

2,714,331

EXTENSIBLE REAR VIEW MIRROR

Romeo Plante, St. Evariste Station (Frontenac), Quebec, Canada, assignor to Forsyth Accessories Regd., St-Evariste Station, Quebec, Canada Application February 23, 1954, Serial No. 411,869

2 Claims. (Cl. 88—98)

The present invention relates to a motor vehicle attachment and more particularly to a rear view mirror adapted to be mounted on the side of a motor vehicle and adapted to be extended from a retracted out of the way position to a projecting position.

The general object of the present invention is the provision of a rear view mirror adapted to be secured to the side of a truck or the like motor vehicle and adjustable to extend laterally in any extended position according to the width of the charge carried by said truck.

Yet another important object of the present invention is the provision of an extensible rear view mirror to be mounted in laterally projecting position on the cab of a truck or the like motor vehicle and which is actuated by a source of motive fluid controlled from within the cab of the truck whereby the driver is not required to reach out of the truck for adjusting the said rear view mirror.

Another important object of the present invention is the provision of a rear view mirror of the character described which is relatively inexpensive to manufacture and which is efficient in operation.

The foregoing and other important objects of the present invention will become more apparent during the following disclosure and by referring to the drawings in which:

Figure 1 is an elevation partly in section of the rear view mirror in retracted position;

Figure 2 is a longitudinal section of the mirror in partly extended position; and Figure 3 is a cross-section along line 3—3 of Figure 2.

Referring now more particularly to the drawings in which like reference characters indicate like elements throughout, the numeral 1 indicates a cylindrical casing closed at its two ends by the head members 2 and 3 screwed in the casing 1.

The head member 2 consists in a conical block having an axial inner bore 4 with a restricted portion 10 of hexagonal cross-section through which slidably extends a tubular mirror supporting arm 5 having an outer hexagonal cross-sectional shape. A packing gland 6 surrounds and frictionally engages the arm 5 and is secured to the head member 2 by means of a threaded collar 7.

The rear view mirror 8 is secured to a rod 9 by means of a universal ball and socket joint, not shown, and the rod 9 is in turn in telescopic frictional engagement with the outer end of the tubular arm 5.

The tubular arm 5 extends within the cylinder 1 and its inner end is provided with an annular metal disk 11 forming a piston which is lined by an annular rubber disk 12 in fluid proof contact with the inner wall of the cylinder 1.

The head member 3 consists in a solid plug which is provided with a ring 13 or other similar means for attaching the rear view mirror unit to a conventional bracket normally secured to the side of the cab of the truck or the like vehicle. The head member 3 is provided with L-shaped fluid passageways 14 and 15 in communication with the pressure fluid tubings 16 and 17 respectively.

The passageway 14 opens directly into the cylinder 1 while the leg 18 of the passageway 15 is in communication with a central tube 19 extending through the piston disks 11 and 12 within the tubular arm 5 to a point opposite the restricted outer end of the head member 2 as clearly shown in Figure 2 at 20.

The tubular arm 5 is provided with side openings 21 adjacent the piston disk 11 for establishing a communication between said tubular arm 5 and the cylinder 1.

The rear view mirror unit, according to the invention, may be operated by any type of fluid under pressure or vacuum. For instance it may be connected to a hydraulic pressure source normally provided on motor trucks or else it may be connected to the source of vacuum provided by the engine of the truck. A control valve, not shown, is inserted into the pressure fluid circuit including the tubings 16 and 17.

The rear view mirror unit, according to the invention, operates as follows when a pressure fluid is used. The fluid admitted by the control valve through the tubing 16 passes into the cylinder 1 through the passageway 14 and exerts an outwardly directed pressure on the piston 11 thereby causing outward movement of the arm 5.

To retract the mirror, the control valve is operated to admit the pressure fluid through tubing 17. The fluid then passes through the central tube 19 within the tubular arm 5 and into the outer end of cylinder 1 through the lateral openings 21 made in the tubular arm 5. Thus the pressure fluid exerts a pressure on the piston 11 in a direction towards the head member 3 to thereby cause retraction of the arm 5.

During retracting movement of the mirror unit the control valve allows free return of the hydraulic liquid from the cylinder 1 through the tubing 16, and during extending movement of the mirror unit, the control valve allows free flow of the pressure fluid through central pipe 20 and tubing 17.

It will be understood that if vacuum is used the operation is reversed, that is, when vacuum is established through tubing 16, the mirror unit accomplishes its retracting movement, while, when vacuum is established through tubing 17, the mirror unit accomplishes its extending movement. When vacuum is used, the tubings 16 and 17 will alternatively be connected through the control valve with the exterior air for extending and retracting movements of the mirror unit respectively.

Due to its outer hexagonal shape, the tubular arm 5 is prevented from rotating relatively to the cylinder 1, but if it is so desired, another non-circular outer cross-sectional shape may be imparted to arm 5.

The mirror unit will be mounted on the truck cab by conventional means and such as to allow universal pivotal movement for adjustment to the line of vision of the driver.

The mirror 8 is maintained in any extended adjusted position because all flow of motive fluid is stopped by the control valve which is then in "off" position, and also because of the friction exerted by the packing gland 6 on the arm 5.

While a preferred embodiment according to the present invention has been illustrated and described, it is understood that various modifications may be resorted to without departing from the spirit and scope of the appended claims.

I claim:

1. An extensible rear view mirror comprising a cylinder, head members closing each end of said cylinder, one of said head members having a bore extending therethrough, a central tube secured to the other head member and extending within the bore of said first named head member, a piston slidable within said cylinder and surrounding said central tube, a tubular arm secured to said piston and surrounding said central tube, said arm projecting through the bore of said first named head member, a mirror secured to the projecting end of said arm, and means to selectively feed motive fluid to the part of said cylinder adjacent said last named head member and to said central tube, said tubular arm having openings adjacent said piston to establish communication between said arm and the part of said cylinder adjacent said first named head member.

2. An extensible rear view mirror as claimed in claim 1, further including a packing gland secured to said first named head member, and tightly surrounding said tubular arm to frictionally engage the same.

References Cited in the file of this patent

UNITED STATES PATENTS

| | | |
|---|---|---|
| 1,274,130 | Winkelman | July 30, 1918 |
| 1,806,059 | Hoople | May 19, 1931 |
| 1,980,149 | Zink | Nov. 6, 1934 |
| 1,992,523 | Dupret | Feb. 26, 1935 |
| 2,035,411 | Udell | Mar. 24, 1936 |
| 2,047,325 | Jones | July 14, 1936 |
| 2,136,836 | Bernard | Nov. 15, 1938 |
| 2,656,764 | Johnson | Oct. 27, 1953 |

FOREIGN PATENTS

| | | |
|---|---|---|
| 576,131 | France | May 7, 1924 |
| 43,079 | Denmark | Sept. 19, 1930 |